Figure 1:
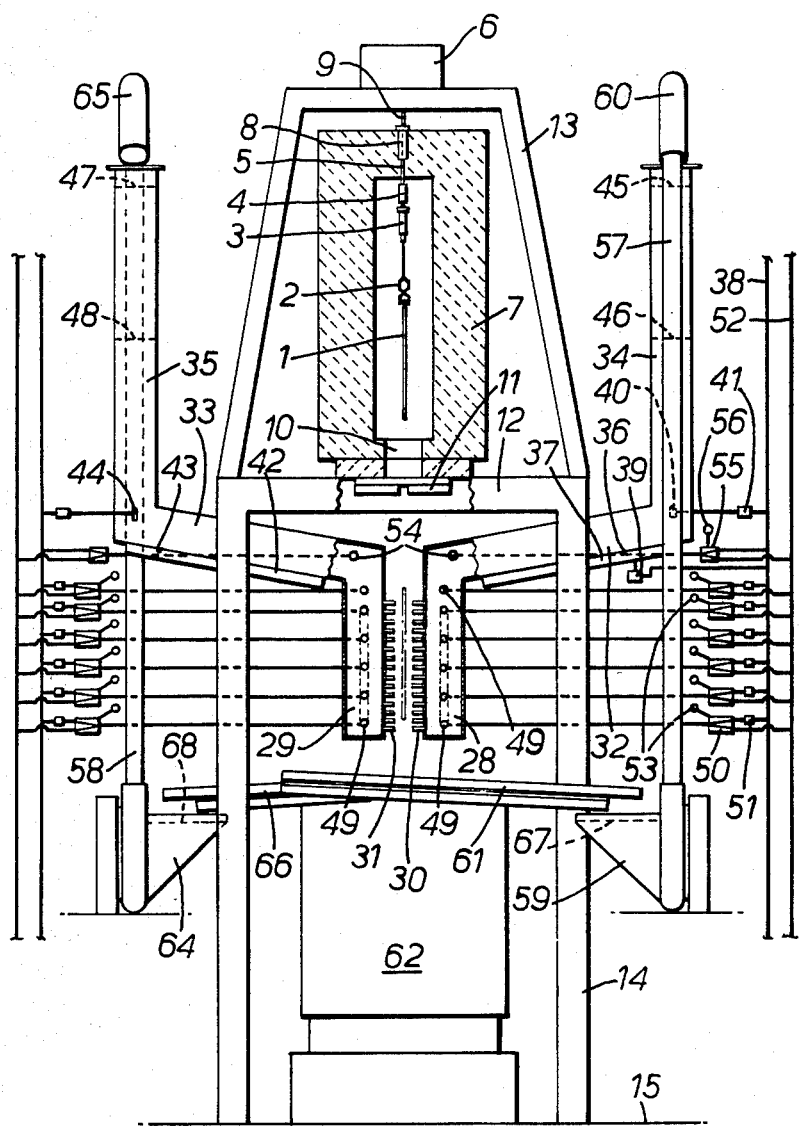

United States Patent [19]

Evason et al.

[11] Patent Number: 4,511,384

[45] Date of Patent: Apr. 16, 1985

[54] THERMALLY TOUGHENING GLASS

[75] Inventors: John Evason, Southport; Malcolm J. Rigby, St. Helens; Peter Ward, Garswood, near Wigan, all of England

[73] Assignee: Pilkington Brothers P.L.C., St. Helens, England

[21] Appl. No.: 460,994

[22] Filed: Jan. 26, 1983

[30] Foreign Application Priority Data

Feb. 1, 1982 [GB] United Kingdom ................ 8202768
Oct. 11, 1982 [GB] United Kingdom ................ 8229004

[51] Int. Cl.³ ............................................. C03B 27/04
[52] U.S. Cl. ...................................... 65/114; 65/348; 65/351; 165/104.16; 165/104.18
[58] Field of Search .................... 65/348, 351, 114; 165/104.16, 104.18

[56] References Cited

U.S. PATENT DOCUMENTS 3,423,198 1/1969 McMaster et al. ............... 65/348 X
3,883,339 5/1975 Michalik et al. .................. 65/115 X Primary Examiner—Arthur Kellogg
Attorney, Agent, or Firm—Burns, Doane, Swecker & Mathis

[57] ABSTRACT

Hot glass is thermally toughened by generating a stream of closely-packed, aerated particles, and projecting that stream towards the glass. A plurality of such streams are projected from an array of nozzles, and the velocity of projection of each stream is sufficient to ensure that the integrity of the stream is preserved in its trajectory towards the glass.

24 Claims, 7 Drawing Figures

THERMALLY TOUGHENING GLASS

This invention relates to the thermal toughening of glass, and more especially to methods and apparatus for thermally toughening glass in which hot glass is quenched with a particulate material.

Traditionally glass has been thermally toughened by directing cool air on to the surfaces of the heated glass. Attempts to increase the degree of toughening achieved by increasing the rate of flow of the cooling air have not always been commercially acceptable because of mechanical damage to the glass surfaces, producing optical defects which makes the toughened glass sheets unacceptable for use as motor vehicle windows.

There have also been proposals for directing a quenching liquid against hot glass surfaces in the form of jets or as an atomised spray of the liquid such as is disclosed in U.K. Pat. Nos. 441,017; 449,602 now D274,527 and 449,864.

It has also been proposed to use as a toughening medium a suspension of particulate material in a gas flow. U.S. Pat. No. 3,423,198 relates to the use of a gaseous suspension of a particulate organic polymer particularly silicon rubber or polyfluorocarbon. U.S. Pat. No. 3,764,403 describes the contacting of hot glass with a snow of sublimable carbon dioxide.

It is a main object of the present invention to provide an improved method and apparatus for the thermal toughening of glass in which a particulate material is directed at the surfaces of glass in order to enhance the heat transfer away from those surfaces in the toughening process.

According to the invention there is provided a method of thermally toughening glass in which the hot glass is quenched with a particulate material, characterised by generating a stream of closely-packed, aerated particles, and projecting that stream towards the glass at a velocity which ensures that the integrity of the stream is preserved in its trajectory towards the glass.

Preferably the stream of particles has a voidage fraction in the range 0.9 to 0.4. More particularly the voidage fraction may be in the range 0.76 to 0.4. The component normal to the glass surface of the velocity of the stream of particles is preferably at least 1 m/s.

For smaller articles a single stream of particulate material may be sufficient to obtain effective toughening of the whole article. For the quenching of larger glass articles, for example, a glass sheet to be used as a motor vehicle window, it is preferred to generate a plurality of said streams of particles which are projected towards the surfaces of the glass.

Preferably during quenching the glass sheet is vertical and the streams of particles are directed towards the surfaces of the sheet.

Alternatively the glass sheet may be supported horizontally and the streams of particles are projected upwardly and downwardly towards the surfaces of the sheet.

Another way of carrying out the invention is characterised by generating a plurality of said streams of particles, and projecting those streams into a quenching, gas-fluidised bed of particulate material towards a surface of the glass which is immersed in the quenching bed. In the preferred way of carrying out this method the glass sheet is suspended vertically and is immersed in the quenching bed, and streams of particles are projected into the quenching bed towards both surfaces of the sheet.

Preferably the streams of aerated particles are generated by supplying aerated particulate material to form the streams.

The streams of particles may be projected from arrays of nozzles which communicate with a supply body of aerated particulate material.

In a preferred way of carrying out the method the supply body comprises a falling supply of the particulate material including entrained gas, additional gas is supplied into the falling supply of particles adjacent the nozzles, and the height of the supply body above the nozzles and the pressure of the additional gas supply are regulated to regulate the velocity of projection of the streams from the nozzles towards the glass at a velocity which ensures that the integrity of each stream is preserved in its trajectory towards the glass surface.

The pressure in the aerated material adjacent to the entrances to the nozzles may be regulated by maintaining a pressure above the surface of the supply body.

Preferably the streams of particles are projected from two vertical arrays of nozzles, each array of nozzles is supplied by a flow from a falling supply of aerated particulate material, and additional gas is supplied into the flows adjacent the arrays of nozzles.

This method may further comprise switching a gas supply to each flow at a plurality of locations which are spaced apart vertically relative to each other adjacent the nozzles to initiate projection of the streams of particles towards the next glass sheet to be toughened.

The switching of gas supply to those locations may be selectively timed, and may begin at the lowermost location.

The invention also comprehends apparatus for thermally toughening glass by the method of the invention, characterised by means for containing a supply of aerated particulate material, means for generating from that supply a stream of closely-packed aerated-particles, means for projecting that stream towards a surface of the glass, and means for regulating the velocity of projection of that stream.

The apparatus may comprise a container for a supply body of aerated particulate material, and an array of nozzles connected to the container for projecting streams of closely-packed aerated particles.

In a preferred embodiment the container is a supply duct which is connected to a supply vesssel for containing a body of aerated particulate material, which supply vessel is positioned to provide an effective head of pressure for supply of the particles, and porous tubes for gas extraction and supply are located in the supply duct adjacent to the entrances to the nozzles.

When toughening a suspended glass sheet the apparatus may comprise two supply ducts each with a vertical array of nozzles, which arrays define between their outlet ends a vertical treatment space for the suspended glass sheet, and two supply vessels respectively connected to the supply ducts.

Individual air slides may connect the supply vessels to the respective supply ducts to maintain the particulate material in an aerated state as it is supplied to the supply ducts.

The apparatus may further comprise a tank for collection of the particulate material from the streams, collection chutes for particulate material mounted adjacent the tank to collect particulate material which spills over the top edges of the tank, and recirculation conveyors which lead from the collection chutes to the tops of the supply vessel or vessels to recirculate particulate material which spills from the tank.

In a modification the tank includes gas supply means at the bottom of the tank for creating a quenching, gas-fluidised bed in the tank, and the tank is mounted on a lift operable to raise the tank to surround the array or arrays of nozzles so that the streams may be projected into a quenching fluidised bed in the tank.

In another embodiment of the invention there may be a closed container for the supply body, with the array of nozzles connected to one side of the container, and gas supply means connected to the top of the container to pressurise the space in the container above the supply body.

When thermally toughening glass sheets there would be two such closed containers for two supply bodies of aerated particulate material each container having an array of nozzles, which arrays of nozzles are positioned to define between them a treatment space for a hot glass sheet.

For the toughening of a horizontally supported glass sheet there may be two supply ducts each with a horizontal array of nozzles, which arrays constitute upper and lower arrays of nozzles which point towards each other and define between them a horizontal treatment space for a glass sheet.

The invention also comprehends thermally toughened glass produced by the method of the invention.

Figure 2:
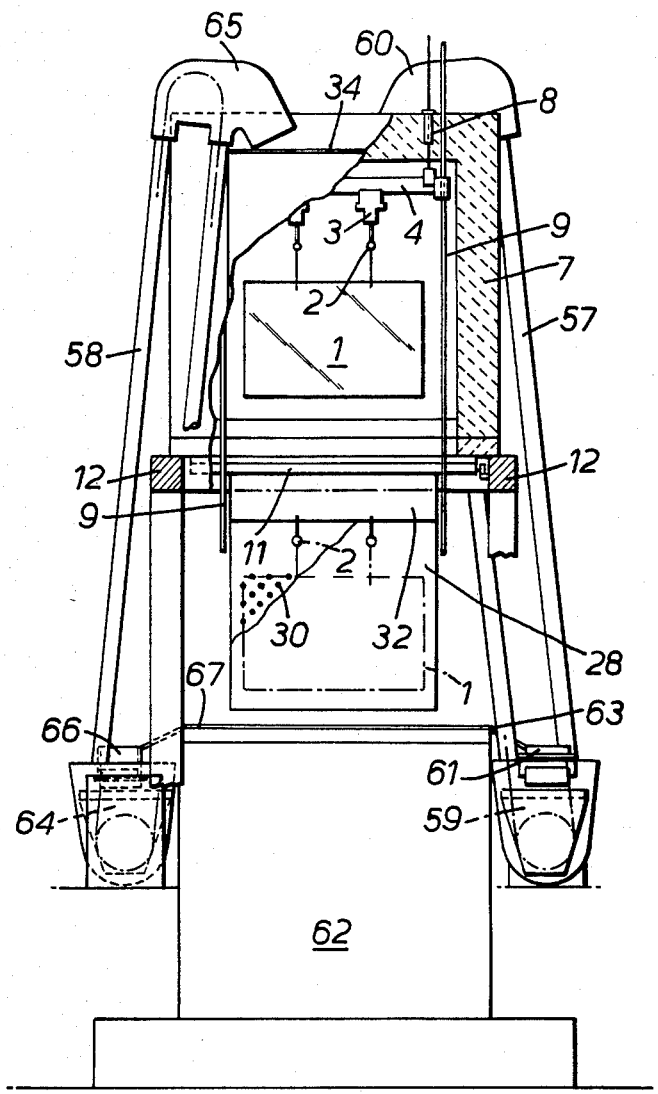
Figure 3:
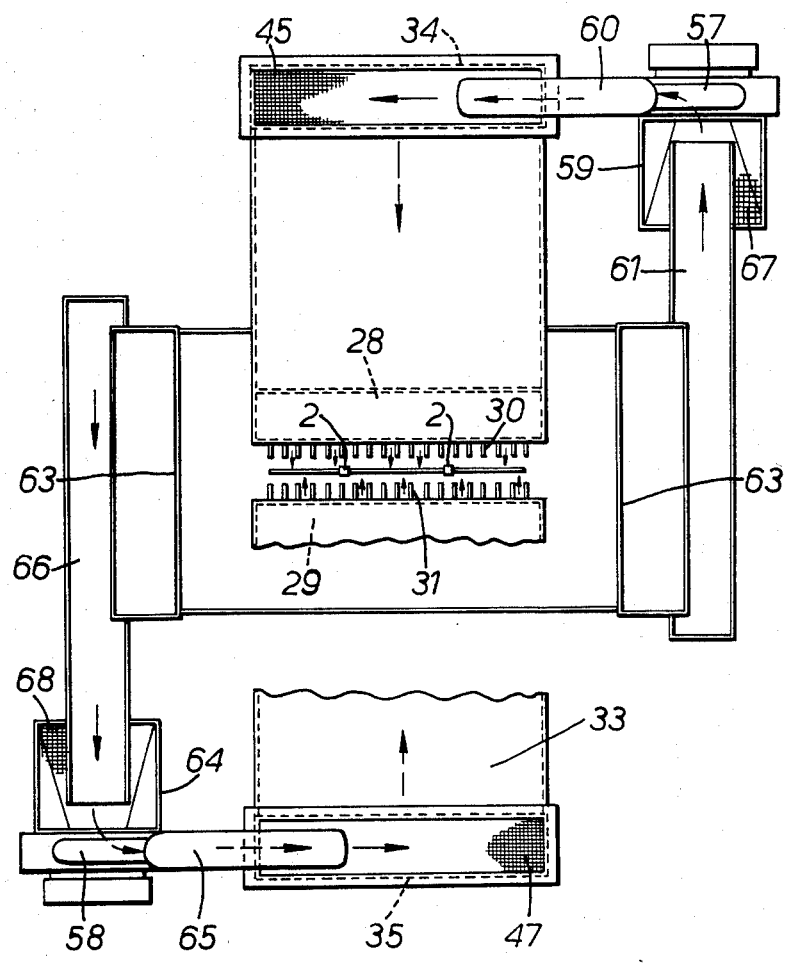
Figure 4:
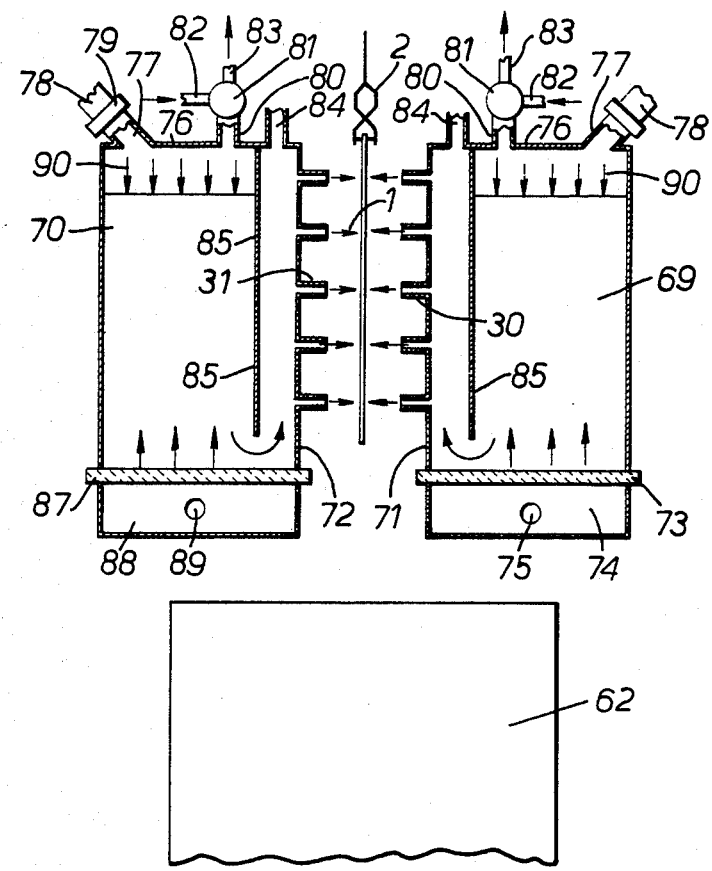
Figure 5:
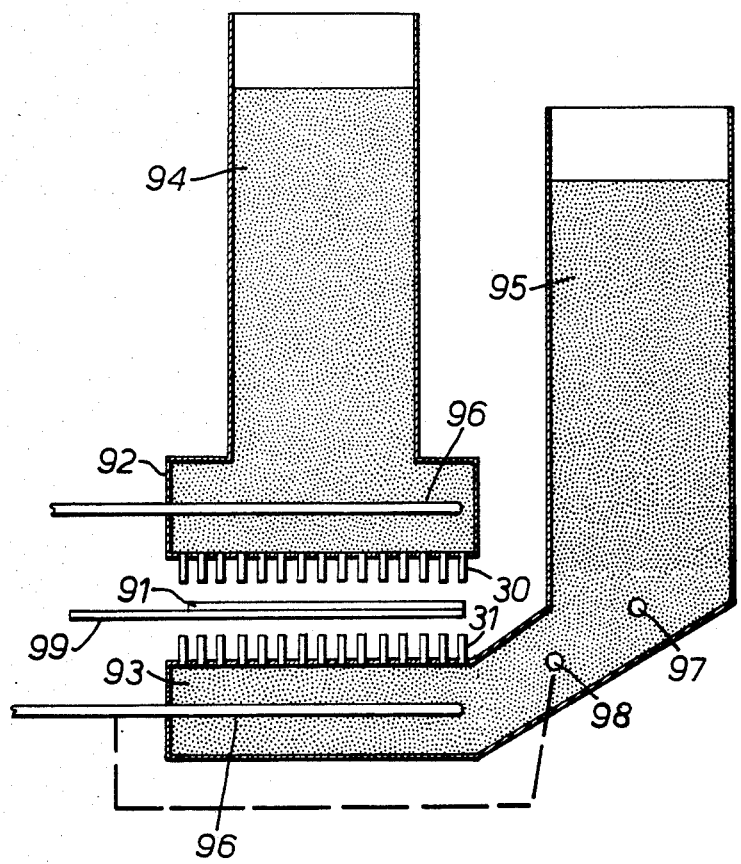
Figure 6:
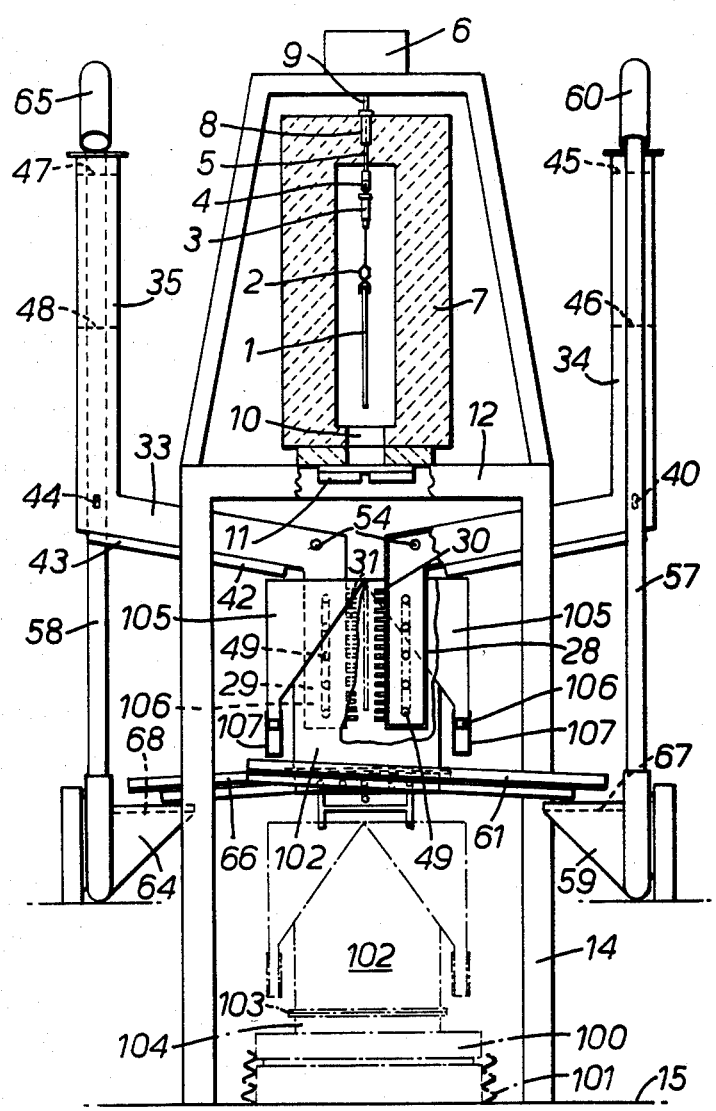
Figure 7:
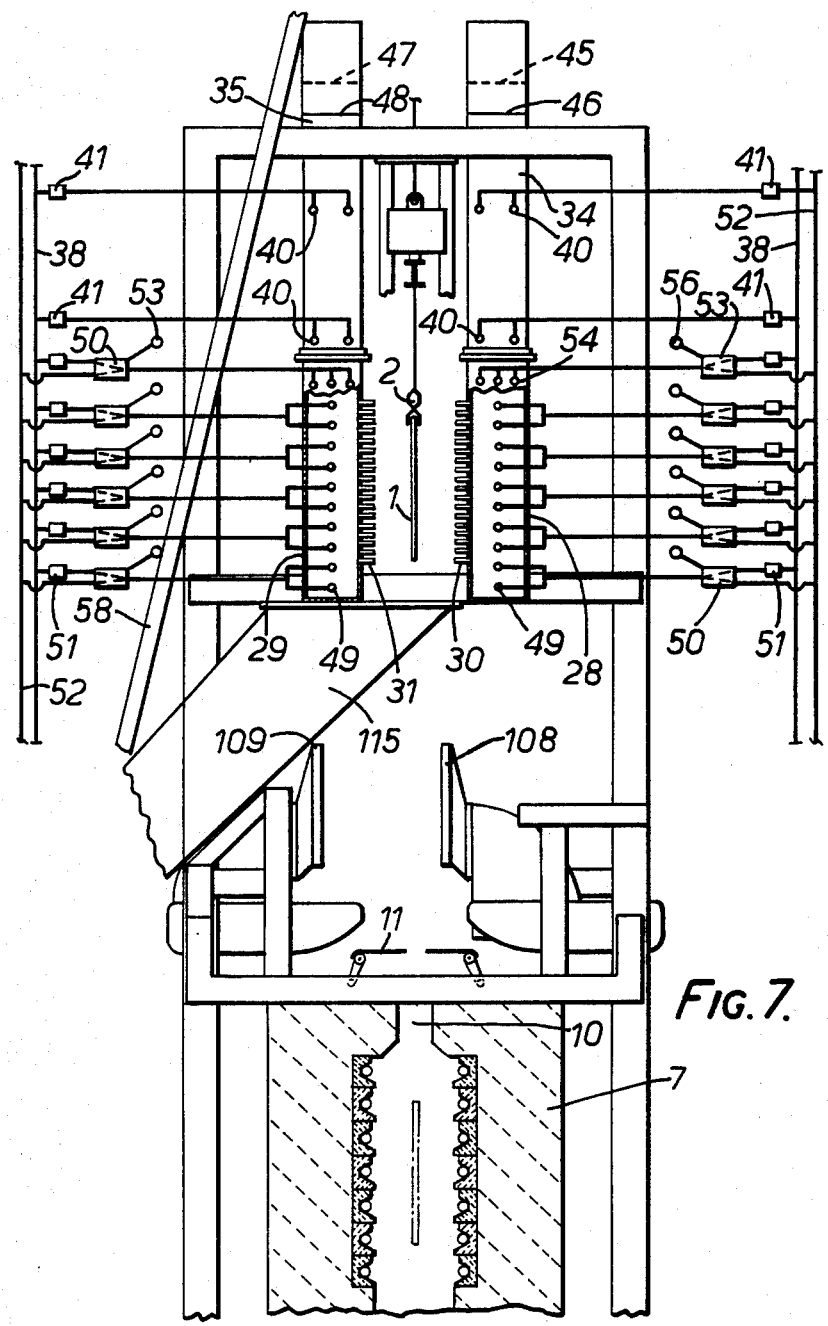

Some embodiments of the invention will now be described, by way of example, with reference to the accompanying drawings in which:

FIG. 1 is a side elevation, partly in section, through one form of apparatus according to the invention for thermally toughening glass sheets, FIG. 2 is a front elevation, partly in section, of the apparatus of FIG. 1, FIG. 3 is a top plan view of the apparatus of FIGS. 1 and 2, FIG. 4 is a diagrammatic vertical section through another embodiment of apparatus for carrying out the invention, FIG. 5 is a diagrammatic vertical section through another embodiment of apparatus in accordance with the invention, for the thermal toughening of a horizontally disposed glass sheet, FIG. 6 is a view similar to FIG. 1, of a modification of the apparatus of FIG. 1 which includes a quenching, gas-fluidised bed, and FIG. 7 is a side elevation, partly in section, of another form of apparatus according to the invention.

Referring to FIGS. 1 to 3, a sheet of soda-lime-silica glass 1, which in the embodiment illustrated is of rectangular shape but could be cut to the shape of a windscreen, sidelight or rearlight of a motor vehicle, is suspended by tongs 2 in conventional manner by a suspension system 3 which depends from a tong bar 4. The tong bar 4 is suspended by hoist cables 5 from a hoist system 6 of conventional kind which is mounted above the roof of a vertical furnace of conventional construction which is indicated generally by the reference 7. The hoist cables 5 run through sleeves 8 in the roof of the furnace 7 and vertical guide rails 9 on which the tong bar 4 runs also extend through the furnace roof. At the bottom of the furnace 7 there is an open mouth 10 which can be closed by hydraulically-operated doors 11. The furnace is mounted on a platform 12 above which there is a frame structure 13 which carries the hoist system 6.

The platform 12 is mounted at the top of a vertical frame structure 14 which extends upwardly from the floor 15.

Two vertical supply ducts 28 and 29 each have an array of nozzles, 30 and 31 respectively, which project inwardly from the front faces of the ducts 28 and 29. The ducts 28 and 29 are mounted on the frame structure 14, and a treatment space for the glass sheet 1 is defined between the outlet ends of the nozzles. The nozzles 30 and 31 of each array are arranged in a "domino-five" pattern extending from the vertical inner face of the respective supply ducts 28 and 29, which ducts are of rectangular cross-section and extend vertically downwards from the outlet ends of individual air slides 32 and 33 which lead from the bottoms of vertical supply vessels 34 and 35 containing columns of particulate material which is to be supplied in an aerated state to the nozzles 30 and 31.

The air slide 32 has a porous floor, indicated at 36, through which air is supplied from a plenum chamber 37. Compressed air is supplied to the plenum chamber 37 from a compressed air main 38, through a pressure regulator 39. Near the bottom of the supply vessel 34 air is supplied through a porous sparge tube 40 to aerate and mobilise the particulate material in the supply vessel 34. The tube 40 is connected through a pressure regulator 41 to the compressed air main 38. Similarly compressed air from the main 38 is supplied from a plenum chamber 42 through the porous floor 43 of the air slide 33, and to a porous sparge tube 44 near the bottom of the supply vessel 35.

A recirculating conveyor system is provided, as will be described, to maintain a supply of particulate material into the top of the supply vessel 34 where the particles fall through a fine filter 45. The downfall of the particulate material through the vertical vessel entrains air from the top of the vessel, which entrained air, together with the air from the slide 32, effectively aerates the particles in the vessel so that they are mobile and can flow downwardly like a fluid. This effect is enhanced by the provision of air at a regulated pressure through the sparge tube 40 at the bottom of the vessel 34, and through the porous floor 36 of the air slide 32 to provide a balanced system of aeration to ensure fluidity of the particles which flow at the appropriate time into the top of the vertical supply duct 28.

The height of the usual surface level 46 of the column of particulate material in the vertical vessel 34 above the nozzles 30 provides, in effect, a head of pressure in the supply of particles to the nozzles 30. With any particular nozzle array, this head of pressure contributes to the control of the velocity with which streams of closely-packed aerated particles are projected from the nozzles 30 towards the glass to be toughened.

The oppositely positioned array of nozzles 31 is similarly supplied with a flow of aerated particulate material from the vertical duct 29 which extends downwards from the air slide 33 which leads from the bottom of the supply vessel 35. There is a fine filter 47 at the top of the vessel 35, and the usual surface level of the column of particulate material in the vessel 35 is indicated at 48.

In each of the vertical supply ducts 28 and 29 there are a plurality of porous gas supply tubes 49, for example of porous sintered metal. The tubes 49 extend horizontally across the ducts behind and adjacent the nozzles and are equally spaced vertically at a plurality of locations in each duct. The tubes 49 are adjustable horizontally towards and away from the entrances to the nozzles. One end of each tube 49 is connected, outside the duct in which it is located, to a change-over valve 50, such as a spool valve, which has a first inlet connected through a pressure regulator 51 to the compressed air main 38, and a second inlet connected to a vacuum main 52. Operation of the spool valve is controlled by a timer 53.

In the embodiment illustrated there are six porous tubes 49, and the timers 53 are under the control of an electronic sequence controller of known kind which controls a sequence of switching of gas supply from the main 38 to the tubes and of gas extraction from the tubes to the vacuum main 52.

When the tubes 49 are connected by the valves 50 to the compressed air supply main 38, air which permeates from the tubes 49 constitutes a supply of additional air into the supply of aerated particles falling down the vertical ducts. Both the height of each supply bed, denoted by the surface levels 46 and 48 of the columns of particulate material, and the regulated pressure of the switched air supplies to the tubes 49 in each duct 28 and 29, determine the pressure in the aerated particles at the entrances to the nozzles. This determines the velocity at which the streams of closely-packed aerated particles are projected from the nozzles 30 and 31 towards the surfaces of a glass sheet when it is suspended in the treatment space between the nozzles 30 and 31.

A porous tube 54 is located at the top of each supply duct 28 and 29, that is in the region of the entrance of the flow of particulate material into each duct. Each tube 54 is connected by a change-over spool valve 55 to the compressed air main 38 and the vacuum main 52. The valve 55 is controlled by a timer 56.

Associated with each of the supply vessels 34 and 35 there is a vertical disc conveyor, 57 and 58 respectively. The conveyor 57 leads upwardly from a hopper 59 to an outlet 60 which is positioned above the open top of the supply vessel 34. The hopper 59 is located beneath the discharge end of an air slide 61 which is fixed at a slight angle to the horizontal and is spaced from one side of a collection tank 62 to receive particulate material which spills over one upper side edge 63 of the tank 62. The conveyor 58 leads upwardly from a hopper 64 to an outlet 65 which is positioned above the top of the supply vessel 35. The hopper 64 is located beneath the discharge end of an air slide 66 which is also mounted at a slight angle as shown in FIG. 1, and receives particulate material from the other upper side edge 63 of the tank 62.

The hoppers 59 and 64 have coarse filters 67 and 68 through which particulate material falls from the discharge ends of the air slides 61 and 66.

The cycle of operation for thermally toughening a glass sheet will now be described.

Initially there are regulated supplies of compressed air to the porous tubes 40 and 44 at the bottoms of the supply vessels 34 and 35, and to the air slides 32 and 33. Supply bodies of aerated particulate material are thereby maintained in a state of readiness in the vessels 34 and 35. Vacuum is switched to the porous tubes 49 and 54. The extraction of gas by the tubes 54 is effective to compact the particulate material at the region of the outlets from the air slides 32 and 33 and impede flow of particulate material from the mobile bodies of aerated particulate material in the supply vessels. Extraction of gas through the tubes 49 impedes any tendency of the particulate material to trickle through the nozzles 30 and 31.

The doors 11 at the bottom of the furnace are open and the tong bar 4 is lowered by the hoist system so that the glass sheet 1 to be toughened can be suspended from the tongs.

The hoist system 6 is then operated to raise the tong bar to the position in the furnace illustrated in FIGS. 1 and 2 and the furnace doors 11 are closed. The glass remains in the furnace for sufficient time to heat the glass sheet to a temperature near to its softening point, for example in the range 620° to 680° C. by radiation from electric heaters in the walls of the furnace. When the glass sheet has reached a desired temperature the doors at the bottom of the furnace open and the glass sheet is lowered rapidly at constant speed into the vertical treatment space between the nozzles 30 and 31. A dynamic brake mechanism in the hoist system 6 ensures rapid deceleration when the glass reaches its position indicated by dotted lines in FIGS. 1 and 2, between the nozzle arrays 30 and 31.

When there is a requirement to produce bent toughened glass sheets, bending dies may be positioned, in known manner, between the furnace and the treatment space. The hot glass sheet is first lowered to a position between the bending dies which are then advanced to close onto the glass sheet and bend it to shape. The dies are then retracted and the glass is lowered into the treatment space.

Alternatively, or additionally, the suspension technique described in No. GB-A-2 038 312 may be used either to assist bending when bending dies are employed, or to effect bending of the suspended glass sheet.

When the glass sheet is stationary in the treatment space, the timers 56 operate the change-over valves 55 which switch the tubes 54 from vacuum to compressed air supply. At the same time the timers 53 associated with the lowermost tubes 49 switch the lowermost change-over valves 50 from vacuum to compressed air supply and aeration of the stagnant particulate material at the bottom of the ducts 28 and 29 begins. The switching sequence continues to switch rapidly the rest of the valves 50 to the compressed air main 38.

There is instantaneous mobilisation of the particulate material in the ducts 28 and 29, and because the flow of aerated particulate material from the supply vessels 34 and 35 is no longer obturated by gas extraction through the tubes 54, the pressure head subsisting in the vessels 34 and 35 is immediately effective and the projection of streams of closely-packed, aerated particles is initiated from the arrays of nozzles towards the surfaces of the glass sheet.

The effective head of pressure, determined by the height of the falling supply of particles in the vertical vessels 34 and 35 and the pressure of air supplied through the porous tubes 49 determines the pressure in the vertical supply ducts 28 and 29 just behind the nozzles arrays 30 and 31. Streams of closely-packed aerated particles are thus projected from the nozzles 30 and 31 towards the surfaces of the glass in the treatment space, at a velocity which ensures that the integrity of each stream is preserved in its trajectory towards the glass.

Excess particulate material spills over the side edges 63 and 67 of the tank 62 and falls down the chutes onto the air slides 61 and 66 for delivery into the hoppers 59 and 64 and recirculation to the tops of the supply vessels 34 and 35 by the conveyors 57 and 58. Soon after flow is initiated replenishment of the particulate material in the supply vessels 34 and 35 maintains the height of the supply beds at about the static surface levels indicated at 46 and 48.

At the end of a toughening period during which the glass sheet is cooled well below its strain point, and toughening stresses are developing as cooling of the glass continues towards ambient temperature, the timer control causes the timers 53 and 56 to switch the valves 50 and 55 to vacuum thereby obturating the flow to the nozzles by compacting the particulate material in the ducts 28 and 29 behind the nozzles and by compacting the material in the region of the outlet from each of the air slides.

Mobility of the aerated supply bodies in the supply vessels is maintained. When the extraction of gas through the tubes 54 has established obturation of the flow of aerated material from the air slides, provision could be made to vent the tubes 49 to atmosphere if there is no tendency for the now stagnant material in the ducts 28 and 29 to trickle out through the lower nozzles of the arrays.

One factor which has been found to influence the degree of toughening induced in the glass is the voidage fraction of each stream of particles, which is defined below, and is preferably in the range 0.9 to 0.4. The effective pressure at the entrances to the nozzles, and hence the velocity at which the streams of closely-packed, aerated particles are ejected from the nozzles is such as to preserve the integrity of each stream in its trajectory towards the glass surface, with the required voidage fraction.

The main controls are therefore the height of the supply beds of aerated particulate material, the pressure of gas released from the porous tubes 49 in the vertical ducts 28 and 29, the time for which the jets are operative, and the geometry of the nozzles and the nozzle arrays.

The amounts of air supplied to the individual tubes 49 as illustrated, or to pairs of these tubes, can be varied independently. This permits independent adjustment of the rate of flow of the particulate material through parts of the nozzle arrays, so that uniformity of quenching can be maintained.

In one arrangement of the apparatus for toughening glass sheets the length of each of the nozzles in the arrays 30 and 31 was 30 mm and the nozzle bore was 3 mm. The nozzles were arranged in a "domino-five" array with a spacing between the nozzles of 20 mm × 20 mm. Each nozzles array occupied a space of 1010 mm × 620 mm and there were 3200 nozzles in each array. The distance between the facing ends of the nozzles of the two arrays was 115 mm. The height of the surface levels 46 and 48 of particulate material in the supply beds in the vertical vessels 34 and 35 was about 2 m above the top of the nozzle arrays 30 and 31. The treatment space, 115 mm wide, between the ends of the nozzle is sufficient to permit quenching of a flat glass sheet or a sheet which has been bent to the curved shape which is usual for a motor vehicle windscreen.

Sheets of soda-lime-silica glass of overall dimensions 300 mm × 300 mm were toughened. Each glass sheet was heated to a pre-quenching temperature, for example 650° C., and then quenched in the streams of particles projected through the nozzles 30 and 31 into the treatment space.

Each stream was projected forwardly towards the glass surface at a velocity which ensured that the boundary of the stream did not become diffuse and the integrity of the stream was preserved in its trajectory towards the glass surface. Usually the streams impinged on the glass before they had curved downwardly to any substantial extent.

It was found to be preferable that each stream has a voidage fraction in the range 0.9 to 0.4. The component normal to the glass surface of the velocity of each stream of particles was at least 1 m/s.

The voidage fraction is an indication of the voidage within each stream of particles. For example, for each stream:

Voidage fraction $= (Vn - Vp)/Vn$ where $Vn$ = volume of a short length of the stream, and $Vp$ = volume of particulate material in that short length of the stream.

The value of voidage fraction decreases as the degree of packing of the particulate material increases, and for powdery material, falls to a value in the region of 0.4 to 0.5 for static piles of powder or very closely packed bodies of powder which are in motion. At the other end of the range, as the voidage fraction increases above 0.9 towards the limiting value of 1.0, which represents pure gas, there is only a minor proportion of powder present in the gas flow.

The streams of particulate material were directed at the glass surfaces for a predetermined period sufficient to induce the required toughening stresses in the glass, after which period the timers 53 actuate the change-over valves 50, and the connection of the porous tubes 49 is switched to the vacuum main 52. Gas extraction at the locations of the tubes 49 obturates the flow of particulate material through the nozzles and the projection of particles from the nozzles towards the glass stops quickly.

At the same time the timer 56 actuates the spool valve 55 to switch the porous tubes 54 to the vacuum main 52. The particulate material in the outlet regions of the air slides 32 and 33 quickly impedes, and then blocks, the flow of particulate material to the supply ducts 28 and 29.

The aerated particulate material in the air slides 32 and 33 and in the supply vessels 34 and 35 is maintained in a mobile state in readiness for the toughening of the next glass sheet.

At the end of a toughening operation the compressed air supplies to the air slides 32 and 33 and the porous tubes 40 and 44 may also be switched off, and the particulate material in the vessels 34 and 35 and the air slides 32 and 33 settles, but must be re-aerated before the next toughening operation.

Some examples of thermally toughening glass sheets by the method of the invention and using the nozzle array just described are set out below.

EXAMPLE 1

The particulate material used was γ-alumina having the following properties:
 Particle density = 1.83 g/cm$^3$
 Particle size range = 20 μm to 140 μm
 Mean particle size = 60 μm A number of the sheets of glass of different thicknesses were heated to 650° C. and then subjected to quenching with the streams of γ-alumina under the following conditions:
 Pressure of air supply to supply tubes 49 = 0.172 MPa Velocity of stream at exit from nozzles = 1.88 m/s
Mass flow rate from each nozzle = 10.1 g/s
Voidage fraction of each stream = 0.602

The degree of toughening of glass sheets from 1.1 mm to 12 mm thick is represented in Table 1.

TABLE I

| Glass Thickness (mm) | Central Tensile Stress (MPa) | Surface-Compressive Stress (MPa) |
|---|---|---|
| 1.1 | 50 | 74 |
| 2 | 63 | 108 |
| 2.3 | 68 | 120 |
| 3 | 80 | 148 |
| 6 | 114 | 240 |
| 8 | 120 | 266 |
| 10 | 124 | 280 |
| 12 | 128 | 286 |

The central tensile stress was measured by a scattered light technique in which a helium/neon laser beam was directed through an edge of the glass, and the retardation fringes measured in the first 20 mm to 30 mm of the glass surface to give a measure of the average central tensile stress in that area of the glass. The surface compressive stress was measured using a differential surface refractometer.

Alteration of the pressure of the air supply to the supply tubes 49 has an effect on the exit velocity of the streams of γ-alumina projected from the nozzles and on the voidage fraction of each stream, as represented in Table II, which sets out results for the toughening of glass sheets 2.3 mm and 3 mm thick which had been heated to a pre-quenching temperature of 650° C.

TABLE II

| Air Supply Pressure (MPa) | Velocity at nozzle exit (m/s) | Voidage Fraction | Mass Flow Rate g/s | Central Tensile Stress (MPa) 2.3 mm | Central Tensile Stress (MPa) 3 mm |
|---|---|---|---|---|---|
| 0.035 | 1.12 | 0.714 | 4.34 | 52 | 56 |
| 0.103 | 1.35 | 0.533 | 8.74 | 66 | 75 |
| 0.172 | 1.88 | 0.602 | 10.1 | 68 | 80 |
| 0.276 | 2.3 | 0.626 | 11.73 | 72 | 84 |

These results indicate how an increase in the air supply pressure from 0.035 MPa to 0.276 MPa results in an increase in the velocity of the particle streams at the nozzle exits from 1.12 m/s to 2.3 m/s. The voidage fraction was within the range from 0.533 to 0.714. The mass flow rate of γ-alumina in each stream increases from 4.34 g/s to 11.73 g/s. The streams retained their integrity and impinged on the glass surface before their trajectories had assumed any appreciable downward curvature, so that the component normal to the glass surface of the velocity of impact of each stream on the glass was not appreciably less than the measured value at the nozzle exits. The normal component is preferably at least 1 m/s, and in order to avoid damage to the glass it was found preferable that the velocity component normal to the glass surface should not exceed 5 m/s.

At a higher glass temperature, for example, 670° C. a somewhat higher degree of toughening was produced. For example a central tensile stress of 87 MPa was induced in a 3 mm thick glass sheet when the air supply pressure to the tubes 45 was 0.276 MPa. Under the same conditions a central tensile stress of 75 MPa was induced in a 2.3 mm thick sheet.

Care has to be taken to ensure that the glass surfaces are not damaged by too high a velocity of the particulate material impinging on those surfaces while they are hot and vulnerable. The upper limit of velocity of 5 m/s was found to be suitable.

A spacing between the nozzle ends down to about 50 mm to 60 mm may be employed. As the spacing is increased the degree of toughening of the glass sheet is lessened, assuming that all other conditions remain constant.

This was shown by varying the nozzle separation from 60 mm to 200 mm when toughening 2.3 mm thick sheets of glass heated to 650° C.m with an air supply pressure to the tubes 45 of 0.172 MPa. The results are in Table III.

TABLE III

| Nozzle Separation (mm) | Central Tensile Stress (MPa) |
|---|---|
| 60 | 90 |
| 80 | 81 |
| 120 | 68 |
| 150 | 67 |
| 200 | 66 |

This indicated that variation of the nozzle spacing in the region from about 120 mm to about 60 mm gave another valuable way of varying the velocity of the streams where they impinge on the glass, and thus varying the stresses induced in the glass.

A nozzle separation of 200 mm is sufficient to accomodate from 80% to 90% of the usual range of curved glass sheets for motor vehicle windscreens, and 95% of usual glass sheets for vehicle rear and side windows.

EXAMPLE 2

Similar trials to those of Example 1 were carried out using alumina trihydrate ($Al_2O_3.3H_2O$) having the following properties:
Particle density = 2.45 g/cm$^3$
Particle size range = 20 μm to 160 μm
Mean particle size = 86 μm A number of sheets of glass of different thicknesses were heated to 650° C. and then quenched with streams of the alumina trihydrate under the following conditions.
Pressure of air supply to supply tube 49 = 0.172 MPa
Velocity of stream at exit from nozzles = 1.77 m/s
Mass Flow rate from each nozzle = 10.38 g/s
Voidage fraction of each stream = 0.68.

The degree of toughening of glass sheets from 1.1 mm to 12 mm thick is represented in Table IV

TABLE IV

| Glass Thickness (mm) | Central Tensile Stress (MPa) | Surface Compressive Stress (MPa) |
|---|---|---|
| 1.1 | 53 | 79 |
| 2 | 68 | 110 |
| 2.3 | 72 | 122 |
| 3 | 82 | 150 |
| 6 | 126 | 259 |
| 8 | 138 | 288 |
| 10 | 140 | 300 |
| 12 | 142 | 309 |

It was again demonstrated how alteration of the pressure of the air supply to the tubes 49 affects the exit velocity of the streams projected from the nozzles, the voidage fraction of the streams, and the degree of toughening of the sheets. The results, with glass sheets 2 mm, 2.3 mm, and 3 mm thick, heated to 650° C. are similar to those using γ-alumina, are set out in Table V.

TABLE V

| Air Supply Pressure (MPa) | Velocity at nozzle exit (m/s) | Voidage Fraction | Mass Flow Rate g/s | Central Tensile Stress (MPa) | | |
|---|---|---|---|---|---|---|
| | | | | 2.0 mm | 2.3 mm | 3 mm |
| 0.035 | 1.13 | 0.736 | 5.65 | 46 | 54 | 58 |
| 0.103 | 1.51 | 0.66 | 9.35 | 60 | 68 | 78 |
| 0.172 | 1.78 | 0.683 | 10.38 | 68 | 72 | 82 |
| 0.276 | 2.51 | 0.729 | 12.44 | 72 | 76 | 85 |

These results show that when using alumina trihydrate an increase in the pressure of the air supply to the tubes 49 from 0.035 MPa to 0.276 MPa results in an increase in nozzle exit velocity from 1.13 m/s to 2.51 m/s. The voidage fraction lies in the range 0.66 to 0.736. The mass flow rate of alumina trihydrate in each stream is increased from 5.65 g/s to 12.44 g/s, and the streams had the same form as in Example 1.

At a higher glass temperature, for example 670° C., a higher central tensile stress of 87 MPa was achieved in a 3 mm thick glass sheet when the air supply pressure was 0.276 MPa.

EXAMPLE 3

With the same nozzle array and dimensions a mixture of 95% by volume of the alumina trihydrate of Example 2 with 5% by volume of sodium bicarbonate, was used for toughening sheets of glass 2.3 mm thick and of overall dimensions 300 mm × 300 mm. The sodium bicarbonate had a mean particle size of 70 μm and a material density of 2.6 g/cm³. Higher stresses were achieved than those achieved by quenching with alumina trihydrate alone. The results obtained are summarised in Table VI.

TABLE VI

| Air Supply Pressure (MPa) | Central Tensile Stress (MPa) | | |
|---|---|---|---|
| | Glass Temp. 630° C. | Glass Temp. 650° C. | Glass Temp. 670° C. |
| 0.035 | 49 | 59 | 63 |
| 0.103 | 70 | 78 | 81 |
| 0.172 | 74 | 84 | 87 |
| 0.276 | 76 | 86 | 89 |

Even higher stresses were produced in 3 mm thick glass under the same conditions as shown in Table VII.

TABLE VII

| Air Supply Pressure (MPa) | Central Tensile Stress (MPa) | | |
|---|---|---|---|
| | Glass Temp. 630° C. | Glass Temp. 650° C. | Glass Temp. 670° C. |
| 0.035 | 53 | 63 | 66 |
| 0.103 | 75 | 84 | 87 |
| 0.172 | 77 | 86 | 89 |
| 0.276 | 79 | 88 | 92 |

EXAMPLE 4

A similar nozzle array to that used for Examples 1 to 3, was employed, but the nozzle bore was 2 mm.

The same alumina trihydrate as in Example 2 was used.

Glass sheets 2.3 mm thick were heated to 650° C. and then quenched with streams of the alumina trihydrate. The operating conditions and results achieved are set out in Table VIII.

TABLE VIII

| Air Supply Pressure (MPa) | Velocity at nozzle exit (m/s) | Voidage Fraction | Mass Flow Rate g/s | Central Tensile Stress (MPa) | Surface Compressive Stress (MPa) |
|---|---|---|---|---|---|
| 0.103 | 1.48 | 0.52 | 5.37 | 71 | 120 |
| 0.137 | 1.78 | 0.483 | 7.1 | 73 | 123 |
| 0.276 | 2.17 | 0.53 | 7.86 | 78 | 132 |

EXAMPLE 5

With the same nozzle array as in Examples 1 to 3, the particulate material used for thermally toughening a glass sheet 2.3 mm thick was a "Fillite" powder which comprises hollow glass spheres derived from pulverised fuel ash from power station boilers, having the following characteristics:

Material density = 2.6 g/cm³
Particle density = 0.38 g/cm³
Particle size range = 15 μm to 200 μm
Mean particle size = 80 μm The air supply pressure to the supply tubes 45 was adjusted to produce streams of the "Fillite" having an exit velocity of 1.4 m/s from the nozzles and a voidage fraction of 0.76.

The 2.3 mm thick glass sheet was heated to 650° C. before quenching and the central tensile stress in the toughened glass sheet was 58 MPa.

EXAMPLE 6

With the same nozzle array as in Examples 1 to 3, the particulate material used was 150 mesh zircon sand having the following characteristics:

Particle density = 5.6 g/cm³
Particle size range = 30 μm to 160 μm
Mean particle size = 110 μm The results achieved when toughening glass sheets 2.3 mm thick are summarised in Table IX.

TABLE IX

| Air Supply Pressure (MPa) | Velocity at nozzle exit (m/s) | Voidage Fraction | Mass Flow Rate g/s | Central Tensile Stress (MPa) |
|---|---|---|---|---|
| 0.103 | 1.5 | 0.86 | 8.25 | 50 |
| 0.172 | 1.7 | 0.865 | 9.02 | 65 |
| 0.276 | 2.2 | 0.80 | 16.88 | 82 |

EXAMPLE 7

By varying the nozzle design without changing the air supply pressures to the tubes 49, it was found that higher exit velocities could be achieved.

This was demonstrated by using the same alumina trihydrate as in Example 2 projected from two vertical nozzle arrays.

In each array the nozzles were arranged in a "domino-five" array with a spacing between nozzles of 20 mm to 20 mm. The length of each nozzle was 55 mm and the nozzle bore was 3 mm. Each array occupied a space of 1010 mm × 620 mm and the distance between the facing ends of the nozzles of the two arrays was 85 mm.

Sheets of glass 2.3 mm thick were heated to 630° C., 650° C. and 670° C. and were quenched by streams of alumina trihydrate projected from this array with air supply pressures of 0.103 MPa, 0.172 MPa and 0.276 MPa which were used in the tests of Example 2.

The results obtained are set out in Table X.

TABLE X

| Air Supply Pressure (MPa) | Velocity at nozzle exit (m/s) | Voidage Fraction | Mass Flow Rate g/s | Central Tensile Stress (MPa) | | |
|---|---|---|---|---|---|---|
| | | | | Glass Temp. 630° C. | Glass Temp. 650° C. | Glass Temp. 670° C. |
| 0.103 | 1.6 | 0.729 | 7.46 | 61 | 66 | 67 |
| 0.172 | 2.32 | 0.741 | 10.38 | 70 | 73 | 77 |
| 0.276 | 4 | 0.823 | 12.21 | 72 | 77 | 81 |

In these examples streams of closely-packed aerated particles with a voidage fraction in the range 0.87 to 0.53 are effective.

A voidage fraction in the range 0.76 to 0.4 has been found to give good results.

Differential toughening effects, for example to produce vision zones in a glass sheet for incorporation in a windscreen, can be achieved by arranging the nozzles in each array according to the desired pattern of regions of higher stress to be induced in the glass sheet which regions of higher stress are interspersed amongst regions of lower toughening stress through which there is adequate vision in the event of fracture of the sheet.

The suspended hot glass may be transported horizontally through the treatment space between the vertical frames. In another way of operating the glass sheets to be toughened may be supported at an angle to the vertical, for example an angle of 45° to the vertical, and moved in a horizontal path between arrays of nozzles through a treatment space which is oriented at a similar angle to the vertical.

Some of the nozzles may be aimed inwardly so as to project streams of particles towards the edges of the glass sheet and enhance the stressing of the edges of the sheet. In another arrangement the nozzles in marginal regions of the arrays may be directed inwardly to cause a generalised flow towards the centre of the glass sheet being toughened.

Another embodiment of apparatus for carrying out the invention is illustrated in FIG. 4.

Two tanks 69 and 70 containing fluidised particulate material, have side walls 71 and 72 which are perforated. The arrays of nozzles 30 and 31 extend from those side walls. The spacing between the nozzle ends is 110 mm and the glass sheet 1 to be thermally toughened is lowered into the treatment space between the ends of the nozzles.

Aerated particles are supplied to each of the nozzles 30 and 31 from fluidised particulate material in the tanks 69 and 70.

A porous membrane 73 at the bottom of the tank 69 forms the roof of a plenum chamber 74 to which fluidising air is supplied through a supply line 75. The top of the tank 69 is closed by a roof 76 which has an inlet port 77 connected to a filling duct 78 which includes a valve 79. Particulate material is filled into the tank 69 through the duct 78 when the valve 79 is open. An air duct 80 communicates with an aperture in the roof 76. In the duct 80 there is a valve 81 by means of which the headspace in the tank 69 can either be connected to a pressure line 82 or can be vented through an exhaust line 83.

A further duct 84 is connected to an aperture in the roof 76 near to the side wall 71 of the tank 69. The duct 84 provides an outlet above a part of the fluidised bed in the tank 69 which is divided from the main part of the bed by a baffle 85 which extends downwardly from the roof 76. The lower end of the baffle 85 is spaced above the porous floor 73 of the tank so as to provide a path, indicated by the arrow 86 for the flow of fluidised particulate material, from the main part of the tank to the space between the baffle 85 and the side wall 71 of the tank, which supplies aerated particles to the nozzles 30. Excess fluidised air is vented through the duct 84.

The same reference numerals are used for the roof structure with its inlet and outlet ducts at the top of the identical tank 70.

At the bottom of the tank 70 there is a porous membrane 87 through which fluidising air is supplied from a plenum chamber 88 which has its own air supply 89. A flow of aerated particles is supplied from the tank 70 beneath the bottom of the baffle 85 as indicated by the arrow 86 to supply the nozzles 31. When an appropriate amount of the selected particulate material has been filled into both the tanks 69 and 70, the valves 79 are closed and the valves 81 connect the pressure lines 82 to the ducts 80 so that a pressure is maintained above the fluidised beds in the tanks 69 and 70. The pressure of the supplies of fluidising air through the ducts 75 and 89 to the plenum chmabers 74 and 88 is such that the particulate material in the tanks 69 and 70 is in a suitable fluidised condition despite the pressure indicated by arrows 90 which is maintained in the headspaces above the two fluidised beds.

By regulating the pressure of the supply of fluidised air through the ducts 75 and 89 in relation to the pressures 90 maintained above the surfaces of the fluidised supply beds, the pressure in the aerated particles which flow to the arrays of nozzles 30 and 31 is controlled to ensure that streams of closely-packed aerated particles are projected towards the surfaces of the glass at a velocity which ensures that the integrity of the streams are preserved in their trajectories towards the glass surface. The switching of the air supplies is controlled in similar manner to that of the embodiment of FIGS. 1 to 3.

Particulate material supplied through the nozzles 30 and 31 is collected and fed to a separate storage tank and in due course returned to the ducts 78 of the tanks 69 and 70.

The use of the baffles 85 permits the level of fluidised particulate material in the tanks 69 and 70 to fall without detriment to the toughening effect which is achieved since a constant pressure is maintained in the headspaces above the surfaces of the fluidised material in the tanks 69 and 70. Venting of gas through the ducts 84 helps to regulate the pressure in the aerated particles being fed to the nozzles.

FIG. 5 of the drawings, shows a further embodiment of the invention suitable for the thermal toughening of a horizontally supported glass sheet 91.

Horizontally disposed supply ducts 92 and 93 containing fluidised particulate material have upper and lower horizontal arrays of nozzles, 30 and 31 respectively.

The nozzles 30 project downwardly from the lower face of the supply duct 92 and the nozzles 31 project upwardly from the upper face of the supply duct 93. A horizontal treatment space for a glass sheet 1 is defined between the ends of the nozzles.

A vertical supply vessel 94 connects with the upper supply duct 92 through its upper face and a supply vessel 95 connects with the lower supply duct 93 through one side. There are porous tubes 96 in each of the supply ducts 92 and 93.

Additional porous tubes 97 and 98 are fitted at the base of the supply vessel 95, the tube 98 being connected in parallel with the tubes 96 of the supply duct 93.

Prior to the processing of a glass sheet, vacuum is switched to the tubes 96 in the supply ducts 92 and 93. Vacuum is also switched to the tube 98 at the base of the supply vessel 95.

By this means the particulate material in the supply ducts 92 and 93 is held in a compacted non-aerated condition. Air is supplied continuously to the tube 97 at the base of the supply vessel 95 so that the particulate material in the vessel 95 is kept aerated in a state of readiness.

A glass sheet 91 which has been heated to a pre-quenching temperature is supported on a frame 99 and moved into the horizontal treatment space. Air is then supplied to the tubes 96 in the upper supply duct 92 and to the tubes 96 and the tube 98 in the lower supply duct 93.

Aeration of the particulate material in the supply ducts 92 and 93 is such that the toughening effect of the particulate material which is projected downwardly through the nozzles 30 onto the upper face of the glass sheet is substantially the same as the toughening effect of the particulate material which is projected upwardly through the nozzles 31 towards the lower face of the glass sheet.

FIG. 6 illustrates, in a view similar to FIG. 1, another way of operating the invention in which the supply ducts 28 and 29 become immersed in a quenching, gas-fluidised bed of the particulate material into which the hot glass sheet 1 is lowered. The streams are projected from the nozzles into the fluidised bed at a velocity which ensures that the integrity of each stream is preserved in its trajectory through the fluidised bed towards the glass.

The nozzle arrays 30 and 31 and the supply of fluidised particulate material is the same as described with reference to FIGS. 1 to 3.

Mounted on the floor 15, within the frame structure 14 is a scissors-lift table 100 surrounded by a bellows 101. The table 100 is indicated by chain-dotted lines in its lowered position. On the table 100 there is a container 102 for a quenching, gas fluidised bed of the same particulate material as is supplied to the nozzles 30 and 31. The container is of rectangular, horizontal cross-section and has an open top. The floor of the container is formed by a porous membrane whose position is indicated by the reference 103. This porous membrane 103 is also the roof of a plenum chambe which is indicated generally by the reference number 104.

The plenum chamber 104 is divided into three parts by partitions, there being a central part which has its own air supply and is located beneath the treatment space; and two outer parts which have a common air supply. Air is supplied at a higher pressure to the central part of the plenum chamber than to the outer parts.

The porosity of the membrane 103 is such that there is a high pressure drop in the air flow through the membrane. The pressure of the air supply to the central part of the plenum chamber is such that the central part of the fluidised bed in the container 102 is in a quiescent, uniformly expanded state of particulate fluidisation. The amount of the particulate material which is initially present in the container 102 is such that when fluidising air is supplied to the plenum chamber 104 the level quiescent surface of the fluidised bed is about half-way up the container.

Cooling tubes, not shown, may be mounted in the container near to its side walls to maintain the fludised bed at a suitable quenching temperature, for example of the order of 60° C. to 80° C.

By operation of the scissors-lift table 100, the container 102 is raised from its lowered position to the raised position illustrated in full lines. The two vertical supply ducts 28 and 29 are immersed in the fluidised bed and the displacement of the fluidised material by the ducts is such that the fluidised bed then fills the container and may spill slightly over the top edge of the container.

The air slide 61 is spaced one side of the container 102 to receive particulate material which spills over the top edge of the container into two collection chutes 105. There are four chutes 105 fixed to the container, which chutes together encircle the whole of the top edge of the container. The other two collection chutes 105 discharge on to the air slide 66. Each of the chutes leads downwardly to a throat 106 to which a spout 107 is hinged. When the container 102 is being raised or lowered the spouts 107 are hinged upwardly, and when the container is in the raised position the spouts are hinged downwardly to overlie the air slides 61 and 66.

The cycle of operation is similar to that described for the embodiment of FIGS. 1 to 3. After the furnace doors 11 have been closed and the suspended glass sheet is heating in the furnace, the scissors-lift table is operated to raised the container. The spouts 107 are hinged upwardly so that they clear the air slides 61 and 66. As soon as the table 100 starts to rise the conveyors 57 and 58 are started. When the container is in its raised position the air supplies to the plenum chamber 104 are switched on.

The air supplied to the plenum chamber 104 fluidises the particulate material in the container 102 with particulate material in the treatment space between the arrays of nozzles in a quiescent uniformly expanded state of particulate fluidisation.

The furnace doors 11 then open and the hot glass sheet is lowered rapidly at constant speed into the treatment space. Immediately after the lower edge of the glass sheet has passed downwardly through the horizontal, quiescent upper surface of the fluidised particulate material, air is switched to the porous tubes 49, and to the air slides 52 and 57. Aerated particulate material flows from the supply vessels 34 and 35 to the nozzles at a pressure such that coherent streams of the particulate material are projected towards the glass sheet through the quiescently fluidised material in the treatment space.

Particulate material spills over the upper edge of the container and is recirculated to the supply vessels 34 and 35 to maintain the static surface levels of the supply fluidised beds.

The quiescent fluidised bed in the container 102 itself imparts a background level of stress to the glass and the heat transfer from the glass surfaces is enhanced by the effect of the submerged streams from the nozzles which reach the glass surfaces and enhance localised agitation of the particulate material at the glass surfaces and produce a more uniform pattern of stressing of the glass than that produced by the streams of particulate material alone.

FIG. 7 illustrates another apparatus according to the invention, for bending and toughening glass sheets.

The same reference numerals are used as in FIGS. 1 to 3 to indicate the same or similar parts.

The furnace 7 is located at the bottom of the apparatus, and bending dies 108 and 109 are mounted above the furnace mouth 10.

The supply ducts 28 and 29, with their nozzle arrays 30 and 31 are lower sections of vertical ducts whose upper sections constitute the supply vessels 34 and 35. The air slides 32 and 33 of the embodiment of FIGS. 1 to 3 are not necessary.

Aeration of the particulate material in each of the upper supply parts 34 and 35 of the ducts is effected by two pairs of porous tubes 40. One pair of tubes 40 is mounted about half-way up each of the upper section. The lower pair of tubes 40 is mounted near the bottom of the upper section. Each pair of tubes 40 is connected through a pressure regulator 41 to the compressed air main 38. The continuous supply of compressed air to the tubes 40 maintains the supply body of particulate material in the upper sections in readiness in an aerated state.

At the top of each of the lower sections 28 and 29, just above the nozzle arrays 30 and 31 there is mounted a bank of three porous tubes 54 which are connected in parallel to a change-over valve 55 which is controlled by a timer 56. One inlet to the valve 55 is connected directly to the vacuum main 52. The other inlet to the valve 55 is connected through a pressure regulator 114 to the compressed air main 38.

In each of the lower sections 28 and 29 there are ten vertically spaced porous tubes 49 which are connected in pairs to change-over valves 50, which are controlled by timers 53, and have inlets connected directly to the vacuum main 52 and inlets connected through pressure regulators 51 to the compressed air main 38.

Operation is similar to that of the apparatus of FIGS. 1 to 3. The switching of vacuum to the banks of three porous tubes 54 in the outlet region from the upper supply sections 34 and 35 of the vertical ducts, serves to effect a positive compaction of the particulate material in those regions above which the aerated supply bodies are supported until flow is required.

The hot sheet 1 is, raised from the furnace to bending position between the dies 108 and 109 which close on to the sheet. After the dies open the bent sheet, which is still hot, is raised to the position shown in the treatment space between the arrays of nozzles 30 and 31.

A powder collection chute 115 moves beneath the nozzle arrays, and the valves 55 then switch compressed air to the tubes 54. This releases the supply bodies of aerated particulate material in the upper sections 34 and 35, and falling flow of material in the vertical ducts is initiated to feed the streams projected from the nozzles as a result of sequential switching of compressed air to the tubes 49, which begins when the timer 56 operates the valve 55.

In each of the embodiments the cross-sectional shape of the nozzles may be varied from the circular, for example the cross section may be oval. In place of nozzles the front faces of the supply ducts 28 and 29 may be formed with arrays of slot- or slit-shaped apertures which are capable of generating streams of closely-packed, aerated particles for projection towards the surface of the glass.

The invention produces thermally toughened sheets of glass with high values of central tensile stress and commensurate high values of surface compressive stress. The central tensile stress is an indication of the high strength of the toughened glass.

For example central tensile stresses in the range 114 MPa to 128 MPa have been produced in glass sheets of thickness in the range 6 mm to 12 mm using the method of the invention.

Thinner glass sheets of thickness in the range 2 mm to 3 mm have been produced, using the invention, having a central tensile stress in the range 60 MPa to 92 MPa, as well as sheets of that thickness range having a central tensile stress below 60 MPa, for example down to about 46 MPa.

Even thinner glass sheets can be thermally toughened to a high strength by the method of the invention. For example toughened glass 1.1 mm thick has been produced with a central tensile stress as high as 53 MPa. 9n

We claim:

1. A method of thermally toughening glass in which the hot glass is quenched with a particulate material, characterised by generating an array of streams of aerated particles, the particles in which streams are sufficiently closely-packed so that each stream has a voidage fraction in the range 0.9 to 0.4 to enhance heat transfer away from the glass by the particulate material in the toughening process, and projecting those streams of closely-packed particles towards the glass and regulating the stream velocity to ensure not only that each stream of particles maintains its closely-packed integrity in its trajectory towards the glass but also that the glass surfaces are not damaged by the closely-packed particulate material.

2. A method of thermally toughening glass in which the hot glass is quenched with a particulate material, characterised by
generating an array of streams of aerated particles by supplying aerated particulate material into said streams from a supply body of aerated particulate material, the particles of which streams are sufficiently closely-packed to enhance heat transfer away from the glass by the particulate material in the toughening process;
supplying additional gas into the aerated particulate material which supplies those streams;
regulating the pressure of the additional gas supply to regulate the stream velocity of each of said streams; and projecting those streams towards the glass with stream velocity which ensures that the integrity of each stream is preserved in its trajectory towards the glass and that the glass surfaces are not damaged by the particulate material.

3. A method of thermally toughening glass in which hot glass is quenched with a particulate material, comprising
generating an array of aerated streams of closely-packed particles;
supplying additional gas into the aerated particles supplying those streams; and
regulating the pressure of the additional gas supply to regulate projection of the streams towards the glass with stream velocity which preserves the integrity of each stream in its trajectory towards the glass and is not detrimental to the glass surface.

4. A method according to claim 1 or 3, wherein each stream of particles has a voidage fraction in the range 0.76 to 0.4.

5. A method according to claim 1 or claim 3, wherein the component normal to the glass surface of the velocity of each stream of particles is at least 1 m/s.

6. A method according to claim 1 or claim 3, wherein the glass is a glass sheet which is substantially vertical and the streams of particles are directed towards the surface of the substantially vertical sheet.

7. A method according to claim 1 or claim 3, wherein the hot glass is a hot glass sheet which is supported horizontally and arrays of streams of particles are projected upwardly and downwardly towards the surfaces of the sheet.

8. A method according to claim 1 or claim 3, wherein said array of streams of particles is projected from an array of nozzles which communicate with a supply body of aerated particulate material.

9. A method according to claim 1 or claim 3, wherein the component normal to the glass surface of the velocity of each stream of particles is in the range of about 1 to 5 m/s.

10. A method of thermally toughening a glass sheet, comprising suspending a hot glass sheet, generating a plurality of streams of closely-packed, aerated particles each of which streams has a voidage fraction in the range 0.9 to 0.4, and projecting those streams of closely-packed particles towards the surfaces of the glass sheet and regulating the stream velocity such that the component normal to the glass surface of the velocity of each stream is in the range of about 1 to 5 m/s to ensure not only that each stream of particles maintains its closely-packed integrity in its trajectory towards the glass but also that the surfaces of the sheet are not damaged by the closely-packed particulate material.

11. A method of thermally toughening a glass sheet, comprising:
suspending a hot glass sheet;
generating a plurality of streams of closely-packed, aerated particles by supplying aerated particulate material to form said streams;
projecting said streams of particles from arrays of nozzles which communicate with a supply body comprising a falling supply of the particulate material including entrained gas;
supplying additional gas into the falling supply of the particulate material adjacent the nozzles; and
regulating the height of the supply body above the nozzles and the pressure of the additional gas supply to regulate the velocity of projection of the streams from the nozzles towards the glass at a velocity which ensures that the integrity of each stream is preserved in its trajectory towards the glass surface.

12. A method according to claim 11, wherein the pressure in the aerated particulate material adjacent to the entrances to the nozzles is regulated by maintaining a pressure above the surface of the supply body.

13. A method of thermally toughening a glass sheet, comprising suspending a hot glass sheet between two vertical arrays of nozzles, supplying to each array of nozzles a flow from a falling supply of aerated particulate material, projecting from said nozzles towards the surfaces of the glass a plurality of streams of closely-packed, aerated particles, and supplying additional gas into the flows adjacent the arrays of nozzles to project those streams at a velocity which ensures that the integrity of each stream is preserved in its trajectory towards the glass.

14. A method according to claim 13, including switching a gas supply to each flow at a plurality of locations which are spaced apart vertically relative to each other adjacent the nozzles to initiate projection of the streams of particles towards the next glass sheet to be toughened.

15. A method according to claim 14, including selectively timing the switching of gas supply to those locations, beginning with the lowermost location.

16. Apparatus for thermally toughening glass, comprising
means for containing a supply of aerated particulate material;
gas supply means located in said containing means for pressurizing said supply of aerated particulate material;
means for generating from that supply in said containing means an array of streams of closely-packed, aerated particles, and for projecting those streams towards a surface of the glass; and means for regulating the pressurizing of said supply of aerated particulate material thereby regulating the voidage fraction of each stream in the range 0.9 to 0.4 and the velocity of projection of each stream with a stream velocity which ensures that the integrity of each stream is preserved in its trajectory towards the glass without detriment to the surface quality of the glass.

17. Apparatus for thermally toughening glass, comprising:
a container for a supply body of aerated particulate material;
an array of nozzles communicating with the container for projecting streams of closely-packed, aerated particles towards a surface of the glass;
gas supply means located in said container for generating in said container a pressure in said supply body; and
means for regulating gas supply to said gas supply means to project said streams towards a surface of the glass at a velocity which ensures that the integrity of each stream is preserved in its trajectory towards the glass and that the glass surface is not damaged by the particulate material.

18. Apparatus according to claim 17, wherein said container is a closed container for the supply body, with the array of nozzles connected to one side of the container, and said gas supply means is connected to the top of the container to pressurise the space in the container above the supply body.

19. Apparatus according to claim 18, characterised by two of said closed containers for two supply bodies of aerated particulate material, each container having an array of nozzles, which arrays of nozzles are positioned to define between then a treatment space for a hot glass sheet.

20. Apparatus for thermally toughening glass comprising:
a container for a supply body of aerated particulate material, which container is a supply duct which is connected to a supply vessel for containing a body of aerated particulate material and which supply vessel is positioned to provide an effective head of pressure for supply of the particles;

an array of nozzles connected to the supply duct for projecting streams of closely-packed aerated particles towards a surface of the glass;

gas permeable means for gas supply located in the supply duct adjacent to the entrances to the nozzles; and means for regulating gas supply to said gas permeable means to regulate the velocity of projection of the streams from the nozzles.

21. Apparatus according to claim 20, including two of said supply ducts each with a vertical array of nozzles, which arrays define between their outlet ends a vertical treatment space for a suspended glass sheet, and two of said supply vessels respectively connected to said supply ducts.

22. Apparatus according to claim 21, wherein individual air slides connect the supply vessels to the respective supply ducts to maintain the particulate material in an aerated state as it is supplied to the supply ducts.

23. Apparatus according to claim 20, characterised by two of said supply ducts each with a horizontal array of nozzles, which arrays constitute upper and lower arrays of nozzles which point towards each other and define between them a horizontal treatment space for a glass sheet.

24. Apparatus according to claim 21, including a tank for collection of the particulate material from the streams, collection chutes for particulate material mounted adjacent the tank to collect particulate material which spills over the top edges of the tank, and recirculation conveyors which lead from the collection chutes to the tops of the supply vessels to recirculate particulate material which spills from the tank.

* * * * *